Feb. 25, 1958 F. J. SKWAREK 2,824,466
ADJUSTABLE PERIPHERY CAM
Filed July 17, 1953

INVENTOR.
Frank J. Skwarek
Darby & Darby
BY
ATTORNEYS.

2,824,466
Patented Feb. 25, 1958

2,824,466
ADJUSTABLE PERIPHERY CAM

Frank J. Skwarek, Westbury, N. Y., assignor to Polarad Electronics Corporation, Brooklyn, N. Y., a corporation of New York Application July 17, 1953, Serial No. 368,718

4 Claims. (Cl. 74—568)

The present invention relates to cams and particularly to a cam so organized that the contour of the periphery thereof may be modified whereby the cam may be utilized to compensate for variable factors in the controlled mechanism. In many situations, particularly in the electronics art, elements are controlled by a cam and these controlled elements are such that when replaced by similar elements there are slight variations. In such situations it is desirable that the controlling cam be capable of adjustment to compensate for such variations. The present invention provides a cam the periphery of which may be modified within limits in order to compensate for such variations as are indicated hereinabove, the adjustment mechanism being exceedingly simple.

It is an object of the invention to provide a cam having a contour which is variable.

It is another object of the invention to provide such a variable cam having a small number of parts and so organized that the adjustment thereof may be simply and readily made, the cam being at the same time easily and inexpensively manufactured.

Other objects and features of the invention will be apparent when the following description is considered in connection with the annexed drawings, in which Figure 1 is a top plan view of the cam body;

Figure 1:
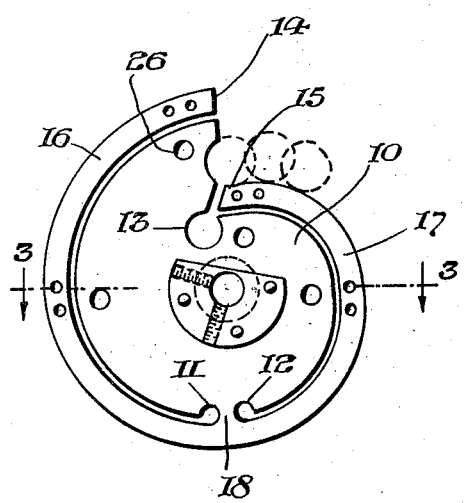

Referring now to the drawings, there is shown at 10 a cam body which is, in the particular instance, in the general form of a spiral. The cam body is drilled as at 11, 12 and 13 and a slot is provided extending from the end 14 of the cam, following the cam outline and terminating in the hole 11. In like manner a slot is provided at the opposite end of the cam designated 15 generally radially inwardly and joining the hole 13. From the hole 13 a slot is made following the cam outline and terminating at the hole 12. By the means stated the two portions 16 and 17 of the periphery of the cam are severed from the cam, save in the area between holes 11 and 12 designated 18. These two cam portions 16 and 17 are thus made flexible so that they may be modified in accordance with a desired pattern.

In order to adjust the cam contour to a desired degree there are provided tabs 20, 21, 22 and 23, tabs 20 and 21 being fixed to the cam portion 16 and tabs 22 and 23 being fixed to the cam portion 17. The tabs 20, 21, 22 and 23 may be fixed to the respective cam portions by any suitable means such, for example, as rivets 24. Each of the tab members extends inwardly and is provided adjacent its inner edge with a slotted opening 25.

Figure 4:
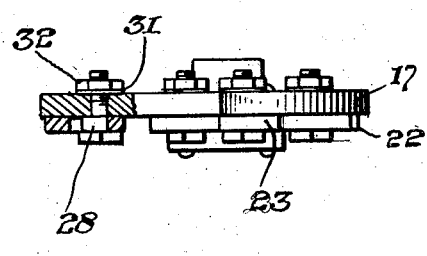
Figure 4 is a side elevation of the cam of Figure 2 viewing partly in section and showing the eccentric means for adjusting the cam contour.
Figure 5:
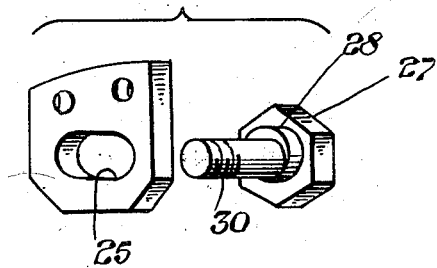
Figure 5 is a perspective enlarged exploded view of an adjustment tab and its cooperating eccentric screw.

The main portion of the cam body 10 is provided with an aperture 26 therein underlying each of the slots 25 and a bolt 27 having an eccentric portion 28 thereon and the usual screwthreaded end 30 is inserted into the slot 25 and then extends through the opening 26 being fixed in position by tightening the nut 32, see Figure 4, against the lock washer 31, thereby clamping the bolt in position on the cam body 10. As will readily be seen, the rotation of the bolt 27 and thus of the eccentric portion 28 thereof will cause radially inward and outward movement of the corresponding tabs 20, 21, 22 or 23 thereby varying the contour of the associated portions 16 or 17 of the cam.

Figure 2:
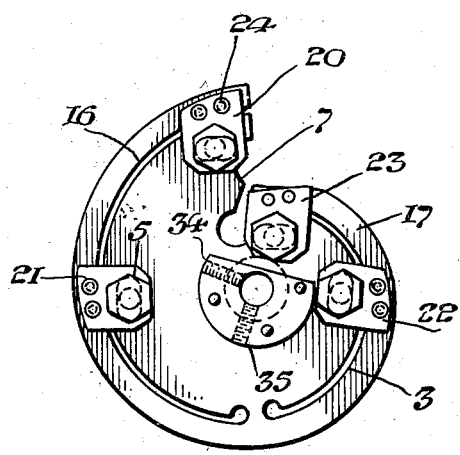
Figure 2 is a view similar to Figure 1 but showing the cam with the adjusting means in place thereon.
Figure 3:
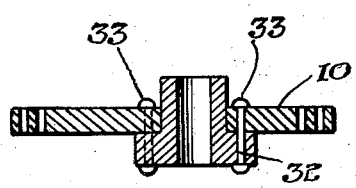
Figure 3 is a vertical cross-sectional view through the cam body of Figure 1 showing particularly the mode of mounting the cam on a hub.

As is indicated in Figure 3, the cam body is provided with a hub 32 which may be fixed to the body 10 in any suitable manner as for example by means of the rivets 33, and as is indicated in Figures 1 and 2, the hub may be provided with setscrews 34 and 35 for fixing the hub and cam on an associated shaft.

As is indicated in the drawings, it is preferable that there be at least one tab 22 and cooperating adjusting member or bolt 27 for each 90° of arc of the cam. It has been found that when the adjusting means is provided in lesser numbers than stated, for example, one for 180° of arc, there is a reversal in the cam direction adjacent the starting end of the cam, that is, adjacent to the openings 11 and 12 and that the error increases as the portion of the periphery attempted to be adjusted by a single adjusting member increases beyond 90°.

As has been indicated hereinabove, this cam may be used for a variety of purposes. One example of its use is in connection with a tuned electronic circuit wherein the circuit components must be accurately adjusted in order to properly tune the circuit and variations between elements of individual circuits or variations in the same circuit elements resulting from temperature variations and the like will make necessary a different adjustment. By means of the variable periphery of the cam such adjustment may be readily made and the tuning device thus become satisfactory for use even though the individual variation between elements is such as to render the tuning otherwise imperfect.

It will be understood that while four adjustment tabs have been described a different number might readily be substituted and further while eccentric bolts have been indicated as forming part of the adjustment means, other means might be substituted for causing the movement of the flexible portions of the cam inwardly and outwardly.

I wish therefore to be limited not by the foregoing description, but on the contrary only by the claims granted to me.

What is claimed is:

1. An adjustable cam comprising, in combination, a cam body, means comprising a slot along an outer portion of said cam body and generally parallel to the cam contour for rendering a portion of the periphery of the cam flexible members mounted on a side of said peripheral portion and overlying the other portion of said cam body and means rotatably mounted on said cam body in contact with each of said members for causing generally radial movement of said members to adjust the position of said peripheral portion there being at least one of said members for each 90° of arc of said adjustable peripheral portion.

2. An adjustable cam comprising, in combination, a cam body, means comprising a slot along an outer portion of said cam body and generally parallel to the cam contour for rendering a portion of the periphery of the cam flexible, members mounted on said peripheral portion and overlying the other portion of said cam body, and means adjustably mounted on said cam body in contact with each of said members for causing generally radial movement of said members to adjust the position of said peripheral portion, there being at least one of said members for each 90° of arc of said adjustable peripheral portion, each of said members being in the form of a tab having a slotted opening therein, and said means for adjusting the position of each of said members and the associated peripheral portion comprising a bolt having an eccentric portion located in each said slotted opening, said bolts being rotationally adjustable in said cam body.

3. An adjustable cam comprising, in combination, a cam body having a slot near the peripheral surface thereof rendering an integral portion of said peripheral surface flexible, and a plurality of means for adjustably positioning respective points of said peripheral surface with respect to the center portion of said cam body, there being at least one of said means for each 90° of arc of said flexible peripheral portion, each said means comprising a member on a side of said cam extending over both the peripheral portion and the central portion of said cam, and radially adjustable attaching means for attaching each said member to at least one of said portions of said cam, said adjustable attaching means comprising a bolt extending through apertures in said member and cam, at least one of said apertures being elongated.

4. An adjustable cam comprising, in combination, a cam body, means comprising a slot along an outer portion of said cam body and generally parallel to the cam contour for rendering a portion of the periphery of the cam flexible, members mounted on said peripheral portion and overlying the other portion of said cam body, and means adjustably mounted on said cam body in contact with each of said members for causing generally radial movement of said members to adjust the position of said peripheral portion, there being at least one of said members for each 90° of arc of said adjustable peripheral portion, each of said members being in the form of a tab having a slot therein, said slot being generally perpendicular to the radius of said cam, and said means for adjusting the position of said members and their associated peripheral portion comprising a bolt having an eccentric portion located in each said slotted opening, said bolts being rotationally adjustable in said cam body, and means operative to prevent the rotation of said bolts.

References Cited in the file of this patent

UNITED STATES PATENTS

| | | |
|---|---|---|
| 231,188 | Paul | Aug. 17, 1880 |
| 1,504,274 | Schneider | Aug. 12, 1924 |
| 1,524,461 | Speer | Jan. 27, 1925 |
| 1,612,500 | Ezbelent et al. | Dec. 28, 1926 |
| 1,847,466 | Binns | Mar. 1, 1932 |
| 2,026,098 | Palmer | Dec. 31, 1935 |
| 2,282,038 | Davenport | May 5, 1942 |
| 2,583,952 | Kmiecik | Jan. 29, 1952 |